Figure 5:
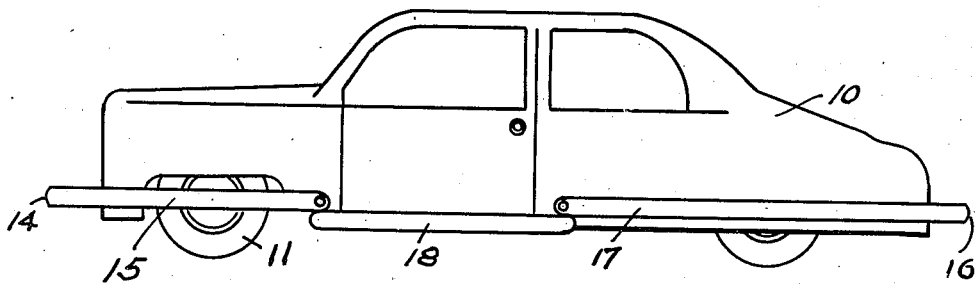

Sept. 21, 1943.  N. R. WOLFE  2,329,808
BUMPER
Filed Sept. 22, 1942　　2 Sheets-Sheet 1
FIG. 1
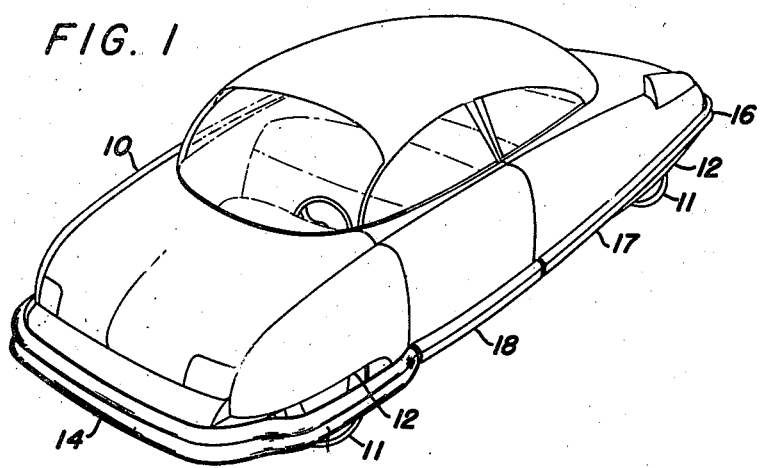
FIG. 2
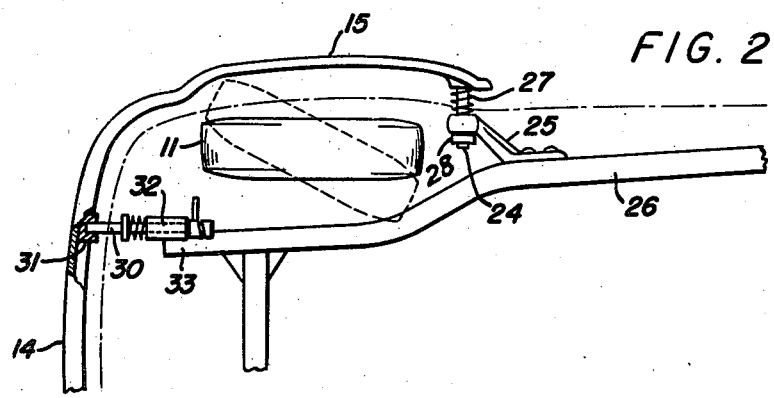
FIG. 4
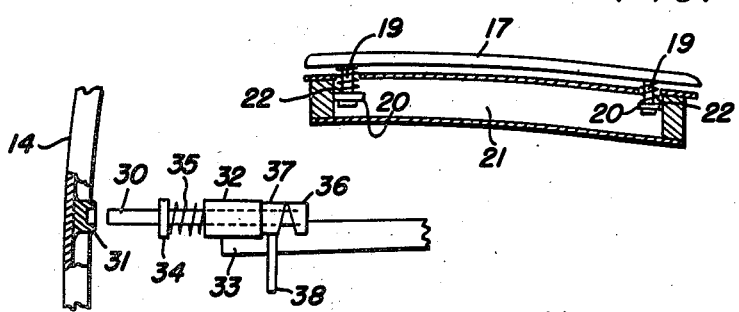
FIG. 3
NICHOLAS R. WOLFE
INVENTOR
BY *Herbert E. Smith*
ATTORNEYS Sept. 21, 1943.     N. R. WOLFE     2,329,808
BUMPER
Filed Sept. 22, 1942     2 Sheets-Sheet 2

NICHOLAS R. WOLFE
Inventor

By Herbert E. Smith
Attorney

Patented Sept. 21, 1943

2,329,808

UNITED STATES PATENT OFFICE 2,329,808

BUMPER

Nicholas R. Wolfe, Seattle, Wash.

Application September 22, 1942, Serial No. 459,244

1 Claim. (Cl. 293—57)

My invention relates to improvements in a bumper for vehicles and more particularly relates to the provision of a comprehensive protective guard for automobiles.

It is well known that in the present designs of automobiles much of the body and its appurtenances is exposed to incidental contact with other vehicles and external objects to the end that, in a relatively short time, scratches, dents and other disfiguring marks mar the finish and body lines. It is customary to provide a rail, more often called a bumper, for the front and rear exposed portions of the body, but the protection thus afforded is limited only to impacts from directions within the bounds of these end bumpers. The fenders, wheel enclosing skirts and body portions along what may be roughly described as the side of the automobile are left largely unprotected. Hub caps are often among the casualties from minor collisions and blows and the invaluable tires often suffer cuts and contusions which reduce, if not destroy their useful life.

Having in mind the defects of the prior art, it is an object of my invention to provide a bumper for automobiles that comprehensively protects an automobile from impacts.

Another object of this invention is the provision of a bumper which will protect the automobile wheels and yet that may on occasion be swung to a position permitting the removal or service of tires, wheels and related parts.

A further object of the present invention is to provide, in a bumper of the type described, structure permitting the desired functions and which will not be deleteriously affected by the forces that it is designed to guard against.

The foregoing objects and others ancillary thereto I prefer to accomplish as follows:

According to a preferred embodiment of my invention, I mount upon a vehicle a bumper that surrounds and protects the radiator-grill, fenders, doors and other portions of the vehicle to which it is attached. More specifically, the bumper provided is formed in U-sections, one of which encloses each end of the vehicle and has legs to extend toward the central portion of the vehicle past the wheels and fenders in a protective manner, with any intervening space between the ends of the legs of the opposed U-section being also protected. The U-sections are each pivotally mounted upon the frame of the vehicle for swinging dislocation whenever it is necessary or desirable to remove the wheels, hubs or perform work upon the automobile in the region of the wheels. The swinging of the U-sections is limited to such times as are selected and at all other times remains in the guarding position. The swingably mounted U-sections are latched and retained in the proper protective position, but in a manner that they can either or both be easily unlatched to be moved out of the normal position. Both U- and intermediate or side sections are either resiliently mounted or are inherently resilient so that minor blows and impacts may be received by the bumper and yet upon release of the force the bumper will return to its normal positions and contours.

Figure 6:
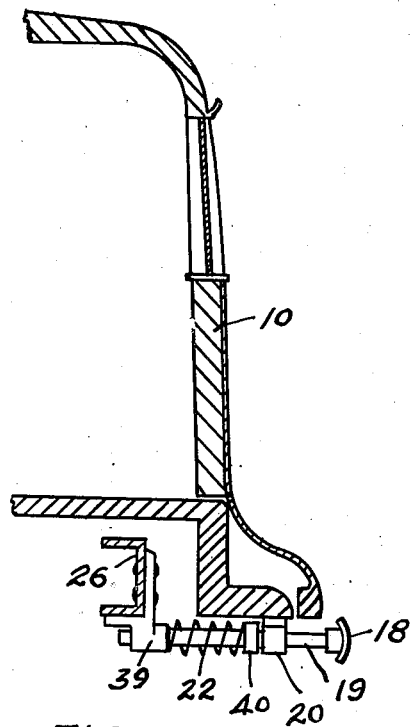

The novel features that I consider characteristic of my invention are set forth with particularity in the appended claim. The invention itself, however, both as to its organization and its method of operation, together with additional objects and advantages thereof, will best be understood from the following description of a specific embodiment when read in connection with the accompanying drawings, in which Figure 1 is a perspective view of a vehicle provided with my bumper, Figure 2 is a plan view of a broken away portion of the U-section of my bumper with parts of the vehicle suggested for convenience of understanding of the general relation, Figure 3 is an enlarged fragmentary view of a portion of a U-section and the latching means employed to release the bumper for swinging movement, Figure 4 is a cross-sectional view through a door or wall panel, illustrating a manner of resiliently mounting intermediate bumper sections to a vehicle, Figure 5 is a side elevational view of a modification of my bumper with the side portion of the bumper mounted below the lower swing edge of the door, and Figure 6 is a cross-sectional view of the modified form of Figure 5, through a door or side panel of the body and showing the manner of resiliently mounting the side bumper.

A bumper to overcome the defects hereinbefore enumerated must have at least two totally distinct characteristics; it must be capable of effectively guarding the automobile from all directions; and it must provide a resilient guard that may nevertheless be simply removed for service or repair of various of the prime functional elements of the vehicle. Accordingly, a preferred embodiment of my invention, referring to Figure 1 of the drawings, is constituted by a bumper which is mounted upon the vehicle 10 which has the usual wheels 11 that are shielded or covered by fenders such as 12. At the front end of the vehicle I mount a U-section that comprises the cross-rail 14 and has side legs 15 that extend rearwardly toward the mid-portion of the automobile. As shown in Figure 2, the side legs 15 are shaped to swell outwardly to permit the turning of the front wheels of the vehicle as suggested by the dashed line showing.

On the rear of the vehicle a similar U-shaped bumper section 16 is mounted to cross the rear exposed portion and has side legs 17 which extend forwardly past the rear wheels and their fenders. Between the ends of the legs of the two bumper sections I mount an intermediate guard bar 18 as shown in Figures 1 and 4. Guard bar 18 has a pair of studs 19, 19 which are shown to pass through suitable door or wall openings or directly beneath them and the brackets 20, 20 either internally of the door 21 or other similar, but non-swinging, wall panels of the vehicle, or as in the case of Figures 5 and 6, to be located directly below the body structure and having a main support on the car frame. The studs are headed in the customary manner and compression springs 22, 22 constantly urge the bumper section 17 outwardly by pressing against the bumper section and the brackets 20, 20.

Both of the U-sections 14 and 16 on the inner faces of the ends of the legs 15 or 17 respectively have pivot pins 24 in the manner shown in Figure 2. A supporting bracket 25 carried by the vehicle frame 26 receives the pivot pin 24 around which is coiled the compression spring 27. A retaining head 28 on the pin 24 prevents outward dislocation of the bumper leg under the urgence of the spring. A blow direct at the bumper leg is accommodated by the spring 27 which upon the relief of the pressure causes the bumper leg to return to its normal position.

The cross rail of each U-section, as 14 in Figures 2 and 3, is supported by the detent pin 30 which seats in the socket 31. Pin 30 is slidably and rotatably mounted in the bushing 32 carried by frame horn 33. Between the shoulder 34 on pin 30 and the end of the bushing 32 is a compression spring 35 which, upon a force striking the cross rail, permits the inward movement of the U-section to provide a resilient guard. At such time, longitudinal force applied to the legs of the U-section are accommodated by the legs resiliently bulging outward slightly due to the resistance of the pivotal mounting of the legs to vehicle frame.

To overcome the force of the springs, as 35, when it is desired to swing the U-sections about their pivots, means is provided for manually withdrawing the detent pins 30 from their seats in the sockets carried by the cross rails. Such a means comprises the head 36 on the pin 30 and the manually rotatable bushing 37 which is mounted on pin 30 between the head 36 and the fixed bushing 32. The faces of head 36 and rotatable bushing 37 are cammed with respect to each other so that upon the rotation of the bushing 37, which may be facilitated by use of the handle 38 or in any other convenient manner, the cammed faces will become opposed rather than complementary, and the pin will be urged against the action of the spring 35. On such occasions, the bumper may then be moved from its normal position to one that is out of the way for service or repair of the then exposed portions of the vehicle.

In the modified form as illustrated in Figures 5 and 6 all arrangement of parts are as shown and described above, with the exception that where the side bumper is mounted to be below the body structure proper so as to allow the doors to swing past and over the side bumper I support the studs 19 in the bracket 39 secured to the main frame and with the spring 22 mounted to engage against the bracket on one end and against a fixed collar 40 mounted on the studs 19, this insures the resilient and shock absorbing effects desired.

Although I have shown and described certain specific embodiments of my invention, I am fully aware that many modifications thereof are possible. My invention, therefore, is not to be restricted except insofar as is necessitated by the prior art and by the spirit of the appended claim.

I claim:

An automobile bumper, including: a cross rail extending in a protective manner across one end of a vehicle, legs on said cross rail extending externally of the vehicle past the wheels and their fenders, means for pivotally connecting said legs to a vehicle; and latch means supported upon the vehicle to retain the cross rail and legs in position, said latch means comprising: a bushing attached to the vehicle, a spring pressed detent pin slidably mounted in said bushing and engaging said cross rail in a supporting manner, and means for manually retracting said detent pin to release the cross rail for swinging movement.

NICHOLAS R. WOLFE.